(12) United States Patent
Etchegoyen

(10) Patent No.: US 10,142,337 B2
(45) Date of Patent: *Nov. 27, 2018

(54) HARDWARE IDENTIFICATION THROUGH COOKIES

(71) Applicant: Uniloc Luxembourg S.A., Luxembourg (LU)

(72) Inventor: Craig S. Etchegoyen, Newport Beach, CA (US)

(73) Assignee: Uniloc 2017 LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/416,920

(22) Filed: Jan. 26, 2017

(65) Prior Publication Data

US 2017/0142107 A1     May 18, 2017

Related U.S. Application Data

(63) Continuation of application No. 13/621,809, filed on Sep. 17, 2012, now Pat. No. 9,571,492.

(Continued)

(51) Int. Cl.
*H04L 9/32* (2006.01)
*G06F 21/00* (2013.01)
(Continued)

(52) U.S. Cl.
CPC ........ *H04L 63/0876* (2013.01); *H04L 63/068* (2013.01); *H04L 63/10* (2013.01); *H04L 63/126* (2013.01)

(58) Field of Classification Search
CPC .... H04L 63/0876; H04L 63/068; H04L 63/10
(Continued)

(56) References Cited

U.S. PATENT DOCUMENTS

| 4,118,789 A | 10/1978 | Casto et al. |
| 4,319,085 A | 3/1982 | Welch et al. |

(Continued)

FOREIGN PATENT DOCUMENTS

| EP | 1 455 258 | 9/2004 |
| EP | 1 637 958 | 3/2006 |

(Continued)

OTHER PUBLICATIONS

Berners-Lee, et al., "Hypertext Transfer Protocol—HTTP/1.0," May 1996, 60 pgs.

(Continued)

*Primary Examiner* — Aravind K Moorthy
(74) *Attorney, Agent, or Firm* — Sean D. Burdick

(57) ABSTRACT

Multiple cookies of a client device are used to form an identifier of the client device such that a change in one or even several browser cookies does not defeat proper device recognition. The cookies are included in the identifier such that individual cookies can be parsed for separate comparison with corresponding cookies of known devices. However, to protect privacy of all devices, individual parameters of the constituent cookies are represented with irreversible hashes of the respective parameters. Recognition involves quantification of a degree of correlation between the cookies and corresponding cookies of each of the known devices. To quantify the degree of correlation, the observed stability and uniqueness of each cookie, and each cookie attribute, is considered.

10 Claims, 8 Drawing Sheets

Related U.S. Application Data

(60) Provisional application No. 61/535,347, filed on Sep. 15, 2011.

(51) Int. Cl.
*G06F 7/04* (2006.01)
*H04L 29/06* (2006.01)

(58) Field of Classification Search
USPC .......................... 726/3, 6; 713/168, 170, 182
See application file for complete search history.

(56) References Cited

U.S. PATENT DOCUMENTS

| | | | |
|---|---|---|---|
| 4,658,093 | A | 4/1987 | Hellman |
| 4,885,778 | A | 12/1989 | Weiss |
| 5,291,598 | A | 3/1994 | Grundy |
| 5,490,216 | A | 2/1996 | Richardson, III |
| 6,158,005 | A | 12/2000 | Bharathan et al. |
| 6,233,567 | B1 | 5/2001 | Cohen |
| 6,243,468 | B1 | 6/2001 | Pearce et al. |
| 6,536,005 | B1 | 3/2003 | Augarten |
| 6,985,953 | B1 | 1/2006 | Sandhu et al. |
| 7,017,044 | B1 | 3/2006 | Carpenter et al. |
| 7,111,167 | B1 | 9/2006 | Yeung |
| 7,181,195 | B2 | 2/2007 | Booth et al. |
| 7,188,241 | B2 | 3/2007 | Cronce et al. |
| 7,272,728 | B2 | 9/2007 | Pierson et al. |
| 7,302,590 | B2 | 11/2007 | Dublish et al. |
| 7,319,987 | B1 | 1/2008 | Hoffman et al. |
| 7,420,474 | B1 | 9/2008 | Elks et al. |
| 7,428,587 | B2 | 9/2008 | Rowland et al. |
| 7,463,945 | B2 | 12/2008 | Kiesel et al. |
| 7,617,231 | B2 | 11/2009 | Moon et al. |
| 7,779,274 | B2 | 8/2010 | Dublish et al. |
| 7,908,645 | B2 | 3/2011 | Varghese et al. |
| 7,934,250 | B2 | 4/2011 | Richardson, III |
| 7,970,946 | B1 | 6/2011 | Djabarov et al. |
| 8,196,176 | B2 | 6/2012 | Berteau et al. |
| 8,396,822 | B2 | 3/2013 | Dasgupta et al. |
| 8,584,114 | B2 | 11/2013 | Rabinovich et al. |
| 8,874,695 | B2 | 10/2014 | Zhang et al. |
| 9,571,492 | B2 * | 2/2017 | Etchegoyen .......... H04L 63/126 |
| 2002/0002445 | A1 * | 1/2002 | Doliov .............. G06F 17/30867 703/2 |
| 2003/0008668 | A1 | 1/2003 | Perez-Breva et al. |
| 2003/0074660 | A1 | 4/2003 | McCormack et al. |
| 2003/0097562 | A1 | 5/2003 | Wheeler et al. |
| 2004/0030901 | A1 | 2/2004 | Wheeler et al. |
| 2004/0030912 | A1 | 2/2004 | Merkle et al. |
| 2004/0062084 | A1 | 4/2004 | Layman et al. |
| 2004/0122931 | A1 | 6/2004 | Rowland et al. |
| 2004/0143746 | A1 | 7/2004 | Ligeti et al. |
| 2004/0187018 | A1 | 9/2004 | Owen et al. |
| 2004/0254890 | A1 | 12/2004 | Sancho et al. |
| 2005/0033833 | A1 | 2/2005 | Baldiga et al. |
| 2005/0050531 | A1 | 3/2005 | Lee |
| 2006/0156387 | A1 * | 7/2006 | Eriksen ................... H04L 67/02 726/3 |
| 2006/0161914 | A1 | 7/2006 | Morrison et al. |
| 2006/0181394 | A1 | 8/2006 | Clarke |
| 2006/0200672 | A1 | 9/2006 | Calhoon et al. |
| 2006/0230317 | A1 | 10/2006 | Anderson |
| 2006/0274753 | A1 | 12/2006 | Park et al. |
| 2007/0113090 | A1 | 5/2007 | Villela |
| 2007/0136726 | A1 | 6/2007 | Freeland et al. |
| 2007/0143073 | A1 | 6/2007 | Richardson et al. |
| 2007/0219917 | A1 | 9/2007 | Liu et al. |
| 2007/0234427 | A1 | 10/2007 | Gardner et al. |
| 2008/0140765 | A1 * | 6/2008 | Kelaita ............... G06F 17/3089 709/203 |
| 2009/0083184 | A1 | 3/2009 | Eisen |
| 2009/0319799 | A1 | 12/2009 | Carpenter et al. |
| 2010/0332320 | A1 | 12/2010 | Mordetsky et al. |
| 2012/0023114 | A1 | 1/2012 | Guo et al. |
| 2012/0030771 | A1 | 2/2012 | Pierson et al. |
| 2012/0066759 | A1 * | 3/2012 | Chen .................... G06F 21/554 726/15 |
| 2012/0215896 | A1 | 8/2012 | Johannsen |
| 2012/0324581 | A1 | 12/2012 | Economos, Jr. et al. |
| 2013/0198826 | A1 * | 8/2013 | Waldron ................. G06F 21/32 726/6 |

FOREIGN PATENT DOCUMENTS

| | | |
|---|---|---|
| EP | 2323062 | 5/2011 |
| GB | 2434724 | 8/2007 |
| WO | WO 2006/089352 | 8/2006 |
| WO | WO 2008/127431 | 10/2008 |
| WO | WO 2009/024913 | 2/2009 |
| WO | WO 2011/147845 | 1/2011 |

OTHER PUBLICATIONS

Beverly, Robert, "A Robust Classifier for Passive TCP/IP Fingerprinting," *Proceedings of the 5th Passive and Active Measurement Workshop*, Apr. 2004, Juan-les-Pins, France, pp. 158-167.

"Computer User" defined and retrieved from Dictionary.com on Jun. 17, 2014, 3 pgs.

Eckersley, Peter, "How Unique is Your Web Browser?" *Lecture Notes in Computer Science*, Jul. 21, 2010, DOI: 10.1007/978-3-542-14527-8_1, pp. 1-18.

Fink, Russ, "A Statistical Approach to Remote Physical Device Fingerprinting," *Military Communications Conference*, Oct. 29, 2007. (Abstract only).

Franklin, Jason et al. "Passive data link layer 802.11 wireless device driver fingerprinting." Proc. 15th USENIX Security Symposium, pp. 167-178, Jul.-Aug. 2006.

Gassend et al., "Silicon Physical Random Functions" *ACM Conference on Computer and Communications*, Washington, D.C., Nov. 18-22, 2002, pp. 148-160.

Heydt-Benjamin, T. S., "Ultra-low-cost True Randomness and Physical Fingerprinting," *Cryptocracy*, Sep. 10, 2007.

HTTP Cookie, Wikipedia. Wikimedia Foundation, Apr. 8, 2010, Web. Jan 28, 2014, http://en.wikipedia.org/w/index.php?title=HTTP_COOKIE&OLDID=377061704.

Johnson et al. "Dimensions of Online Behavior: Toward a User Typology," *Cyberpsycology and Behavior*, vol. 10, No. 6, pp. 773-779, Dec. 2007. XP002617349.

Khanna et al. "A Survey of Forensic Characterization Methods for Physical Devices," *Science Direct*, Jun. 14, 2006, p. 17-28.

Kobsa et al., "Personalised Hypermedia Presentation Techniques for Improving Online Customer Relationships," *The Knowledge Engineering Review*, © Cambridge University Press, United Kingdom, vol. 16, No. 2, 2001, pp. 111-155.

Kohno et al., "Remote Physical Device Fingerprinting," *IEEE Transactions on Dependable and Secure Computing*, vol. 2, No. 2, Apr.-Jun. 2005, pp. 93-108.

Lallous, "Changing Volume's Serial Number," Code Project Feb. 17, 2008, retreived from the internet on Dec. 14, 2010. XP002614149.

Lee P, "Oracle Adaptive Access Manager Reference Guide, Release 10g (10.1.4.5)," May 2009, Internet Article retrieved on Sep. 27, 2010. XP002603489.

Martone et al., "Characterization of RF Devices Using Two-tone Probe Signals," School of Electrical and Computer Engineering, Purdue University, West Lafayette, Indiana, Aug. 26, 2007.

Microsoft, "Using Intelligence and Forensics to Protect Against Counterfeit Intelligence," *Research and Development Industry Report*, Apr. 20, 2010, 1 page.

Muncaster et al., "Continous Multimodal Authentication Using Dynamic Baysian Networks," Second Workshop on Multimodal User Authentication, Toulouse, France, May 11, 2006. XP55003041.

Salo, Timothy J., "Multi-Factor Fingerprints for Personal Computer Hardware," Military Communications Conference, Piscataway, New Jersey, Oct. 29, 2007, 7 pages. XP031232751.

(56) References Cited

OTHER PUBLICATIONS

SecuTech Solution, Inc., "Machine Fingerprint SDK", Aug. 2006, 4 pages.
Smolens et al., "Detecting Emerging Wearout Faults," *In Proceedings of the IEEE Workshop on Silicon Errors in Logic—System Effects*, Apr. 2007, Internet Article retrieved on Sep. 30, 2010. XP002603491.
Transcript from CBS Corp New, UBS Global Media Conference on Dec. 3, 2007 with Dave Poltrack by Matt Coppett, 9 pages.
"Understanding User-Agent Strings," Microsoft.com, updated Jul. 2013, retrieved on Jun. 16, 2014, 9 pgs.
"Uniloc Addresses $40 Billion Piracy Challenge with First Global Piracy Auditing Solution as Part of New Software Copy Control Product Suite," *Product News Network*, © Thomas Publishing Company, Jul. 10, 2007, 2 pages.
"User" defined and retrieved from Webopedia.com on Jun. 16, 2014, 2 pgs.
Vamosi. "Device Fingerprinting Aims to Stop Online Fraud," Mar. 10, 2009.
G. Wiesen, "What is a Device Fingerprint?" *WiseGeek*, 2003, Internet article retrieved Dec. 17, 2011.
Wikipedia: "Device Fingerprint," May 5, 2009, modified Jan. 20, 2011, Internet Article retrieved on Apr. 19, 2011. XP-002603492.
Wikipedia: "Software Extension," May 28, 2009, Internet Article retrieved on Oct. 11, 2010. XP002604710.
H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.
Williams, R., "A Painless Guide to CRC Error Detection Algorithms," Aug. 13, 1993, 33 pages, www.ross.net/crc/download/crc_v3.txt.
Williath, "Future Grid Portal," *VampirTrace*, Dec. 23, 2010.

* cited by examiner

HARDWARE IDENTIFICATION THROUGH COOKIES

This application is a continuation of U.S. patent application Ser. No. 13/621,809, filed Sep. 17, 2012, which is fully incorporated herein by reference. The benefit of such earlier filing dates is hereby claimed by applicant under 35 U.S.C. § 120.

BACKGROUND OF THE INVENTION

1. Field of the Invention

The present invention relates generally to computer network security and, more particularly, to methods of and systems for identifying a computing device by data stored thereon.

2. Description of the Related Art

From the perspective of a server engaged in Internet transactions, it is advantageous to be able to recognize a client computing device that the server has interacted with previously. The importance of this information can be seen in common Internet transactions today. For example, users can log in to a given site and, through information gleaned from a quick retrieval of cookies stored on the user's device, the site's server can tailor its interaction to the user's known expectations and preferences. Similarly, a user's experience with a virtual shopping cart during on-line shopping may be enhanced if the server hosting the shopping cart can recognize whether multiple HTTP requests from multiple-link clicks originate from the same device.

Technically speaking, HTTP (hypertext transport protocol)—the protocol by which web browsers and web servers primarily interact—is stateless. That means that any HTTP request and any HTTP response thereto are fully self-defining and not contingent on (or influenced by) HTTP requests or responses previously exchanged. In other words, the exchange of an HTTP request and an associated HTTP response do not change any "state" in the communication between the client device and the server.

To implement features that require a state, such as a virtual shopping cart, the client device and the server are required to cooperate to effect an ongoing or dynamic state in their interaction. The way in which this is accomplished most often is through the use of cookies, which are omnipresent in online transactions today.

In the context of computer communications, a cookie is a unique item of data that stores state information. Each time the browser of a client computer transacts with a web site, the web site server may transmit a cookie to the browser that provides unique identifying data for storage on the client device. On a subsequent visit to the same web site, the site can request that the client device report the unique, identifying data recorded on the cookie and thereby recover a state of interaction between the client and server from a previous transaction. For example, if a server asks a client device to store a cookie labeled ABC123, the server can then recognize the same client device whenever the client device reports that its cookie for that server is ABC123.

Cookies have been used very effectively to maintain a state during interaction between a server and a client device. There are, however, other situations where recognition of a particular computing device is highly desirable, but for which cookies are simply inadequate. In particular, cookies don't work when the user doesn't want her device to be recognized or when the device needs to be identified across multiple sites. For example, if a user has been banned from a social networking site for malicious activity, the user can avoid detection by way of cookies by simply deleting all of the cookies associated with the social networking site. Similarly, a different social networking site would not be able to identify the user as one who has behaved maliciously if a cookie from the first site was the only indicator of such prior activity.

What is needed is a more persistent and reliable way to identify a particular computing device through exploitation of cookies.

SUMMARY OF THE INVENTION

In accordance with the present invention, multiple cookies of a client device are used to form an identifier of the client device such that a change in one or even several browser cookies does not defeat proper device recognition.

The cookies are included in the identifier in such a manner that individual cookies can be parsed for separate comparison with corresponding cookies of known devices, i.e., devices previously interacted with. To protect privacy of all devices, however, individual parameters of the constituent cookies are represented in the device identifier with irreversible hashes of the respective parameters. For example, data representing the host parameter of a cookie is represented in the device identifier as an irreversible hash of the data, allowing direct comparison to determine whether cookies of other devices come from the same host without enabling identification of the host itself. In other words, the use of irreversible hashes allows effective, yet anonymous, comparison. Other parameters of the cookies that are represented by irreversible hashes include attribute names and values. Expiration is left readable to determine whether a given cookie has expired.

Recognition involves quantification of a degree of correlation between cookies represented in the device identifier of the client device and corresponding cookies of each of the known devices. Since cookies change over time, it is quite likely that cookies represented in the device identifier of the client device would not be identical to cookies previously received from the same device. To quantify the degree of correlation, the observed stability and uniqueness of each cookie, and each cookie attribute, is considered.

Once cookie correlation between the client device and each of the known devices has been quantified, the highest of the correlations is compared to a predetermined threshold degree of correlation. The threshold is determined empirically during system configuration and represents an acceptable level of certainty and, conversely, uncertainty. For example, the threshold can be selected at a level at which certainty of accurate recognition is 95%. If the highest of the correlations is at least the predetermined threshold, the client device is determined to be the same device as the known device with the highest cookie correlation. Otherwise, the client device is determined to be unrecognized, i.e., a device that has not been previously interacted with.

In a first aspect, the present invention accordingly provides a method for recognizing a given remotely-located device as a known device, the method including: receiving, from the given device, data representing at least two browser cookies from at least two hosts; determining an amount of correlation between the browser cookies of the given device and corresponding browser cookies of each of one or more other devices; and determining that the given device is a known device upon a condition in which the amount of correlation is at least predetermined threshold.

In another form, the data representing at least two browser cookies from at least two hosts includes an irreversible hash of host data of each of the browser cookies. In another form, the data representing at least two browser cookies from at least two hosts includes an irreversible hash of attribute value data of each of the browser cookies. In another form, the step determining an amount of correlation between the browser cookies of the given device and corresponding browser cookies of each of one or more devices includes: using a degree of stability of each of the browser cookies.

In another form, the step determining an amount of correlation between the browser cookies of the given device and corresponding browser cookies of each of one or more other devices includes: using a degree of uniqueness of each of the browser cookies.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

In accordance with the present invention, an identifier of a client device 102 (FIG. 1) is derived from browser cookies 730 (FIG. 7) stored on the client device in such a manner that enables accurate determination by a server computer 106 (FIG. 1) whether client device 102 is previously known to server 106. Client device 102 derives the device identifier from multiple browser cookies, so that a change in one or even several browser cookies does not defeat proper device recognition.

Figure 1:
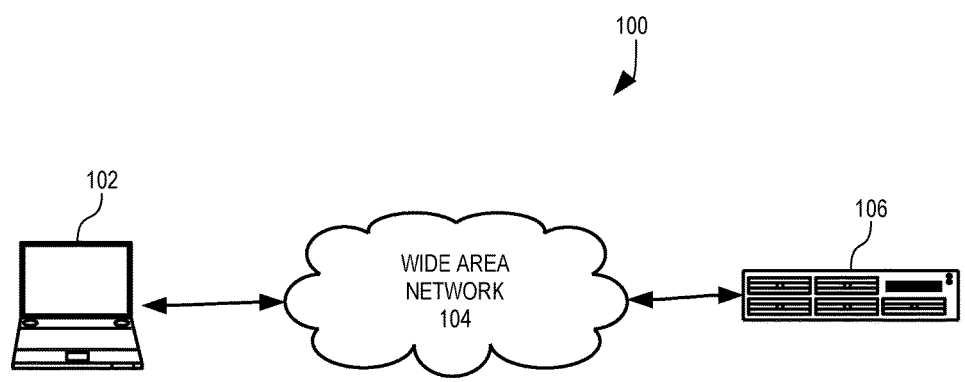
FIG. 1 is a block diagram showing a client device and a server computer that cooperate to perform device identification in accordance with one embodiment of the present invention.

As shown in FIG. 1, client device 102 and server computer 106 communicate with one another through a wide area network 104, which is the Internet in this illustrative example. Server computer 106 can have any of a number of motivations to recognize client devices with which server computer 106 has previously interacted. Examples include customization of web page content for individual users, and recognition of client devices previously used for malicious activity.

Figure 2:
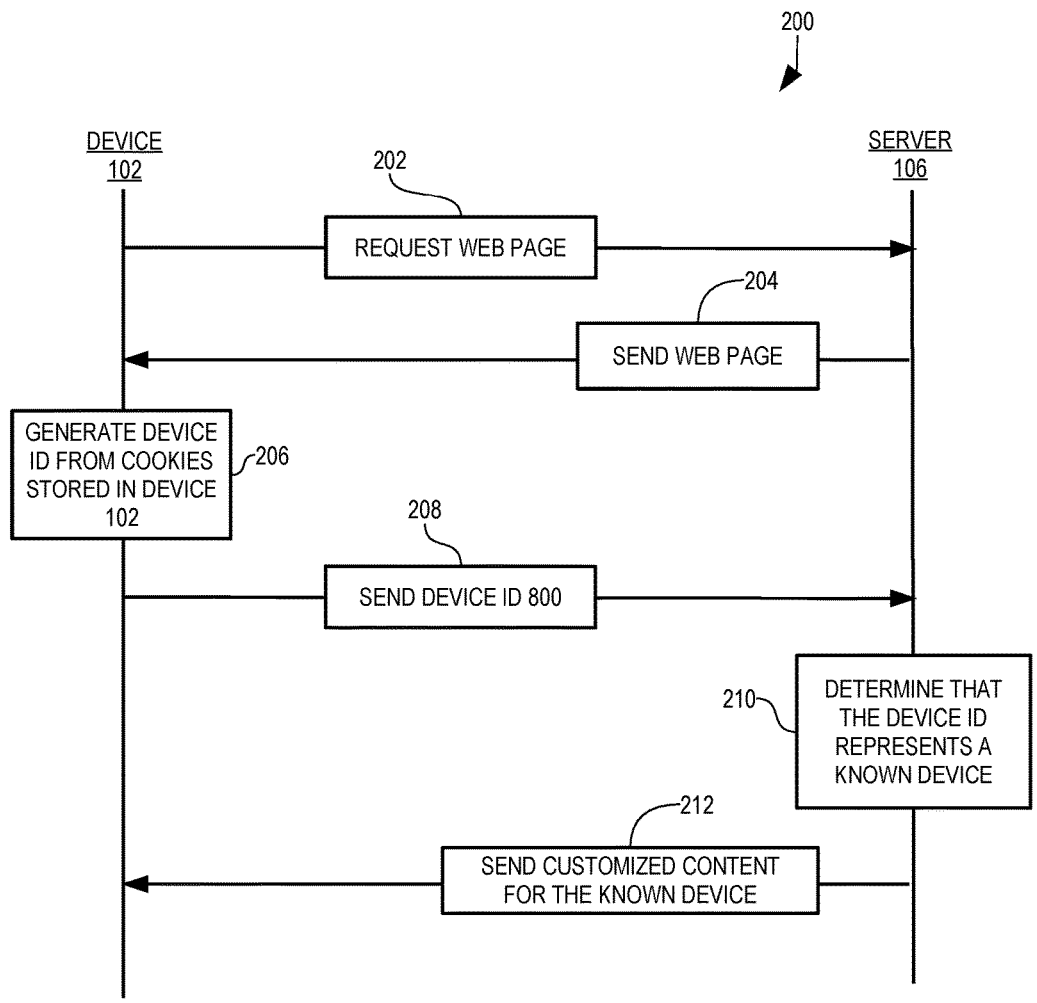
FIG. 2 is a transaction flow diagram illustrating the manner in which the client device and server computer of FIG. 1 cooperate to perform device identification.

Transaction flow diagram 200 (FIG. 2) represents the manner in which client device 102 and server computer 106 cooperate to determine whether client device 102 is a device that is previously known to server computer 106 in accordance with the present invention.

In step 202, client device 102 requests a web page or other data from server computer 106, e.g., from a URL activated by a human user of client device 102 through physical manipulation of one or more user input devices of client device 102 and conventional user interface techniques.

Figure 3:
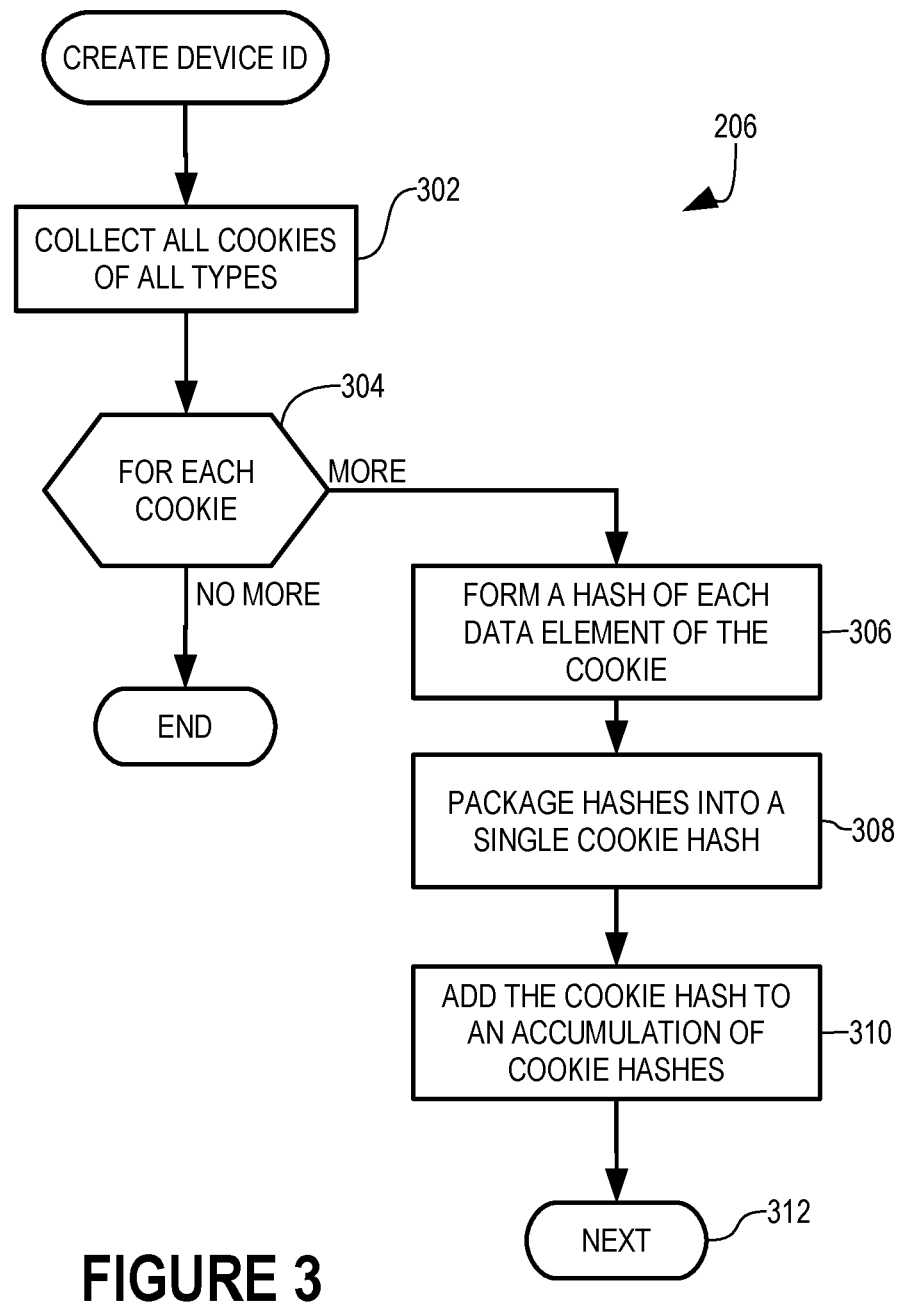
FIG. 3 is a logic flow diagram illustrating the manner in which the client device creates a device identifier in a step of the transaction flow diagram of FIG. 2 in greater detail.
Figure 7:
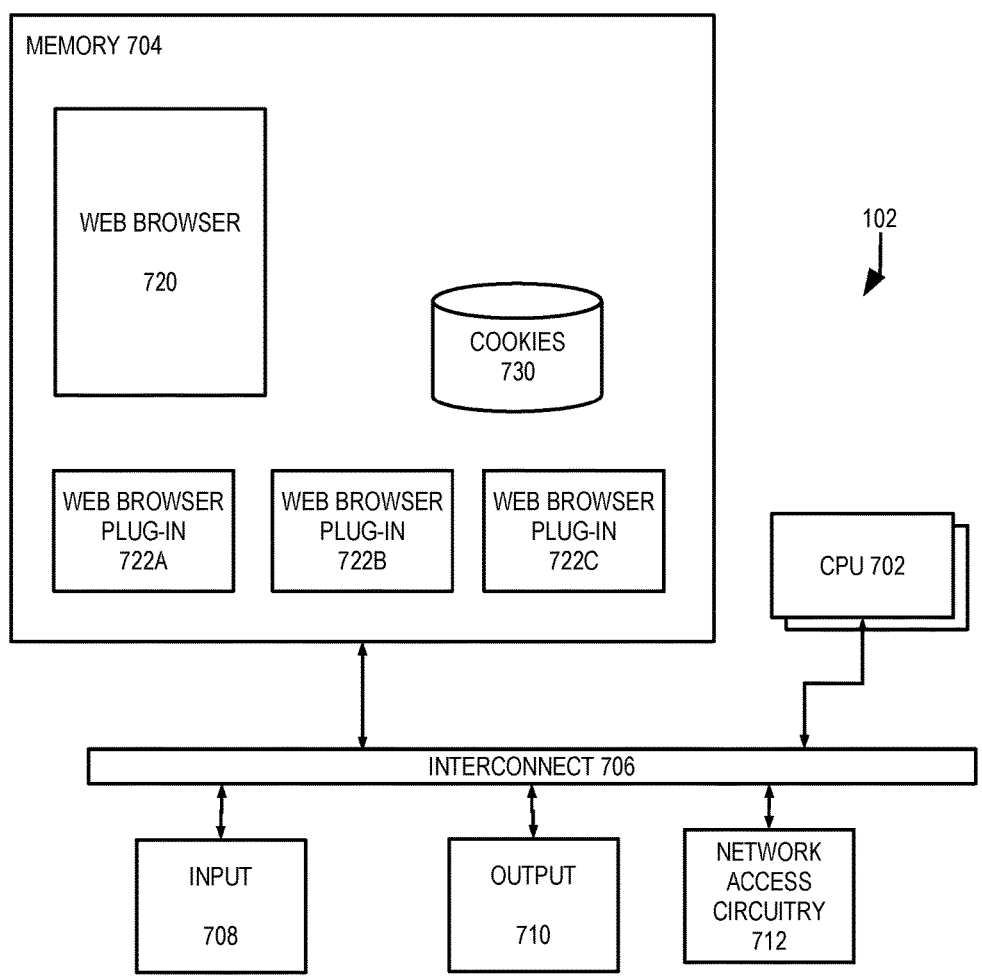
FIG. 7 is a block diagram showing the client device of FIG. 1 in greater detail.

In step 204, server computer 106 sends the web page that is identified by the URL received in step 202. The web page includes some active content or at least some content that causes client device 102 to generate a device identifier for itself from browser cookies 730 (FIG. 7). In one embodiment, a web browser plug-in 722C is installed in client device 102 and is invoked by a web browser 720, in processing the content of the web page, to generate the device identifier from cookies 730. The various elements of client device 102 and their interaction are described more completely below. In addition, step 206 is described more completely below with respect to logic flow diagram 206 (FIG. 3).

In step 208, client device 102 sends the device identifier that was generated in step 206 to server computer 106.

Figure 4:
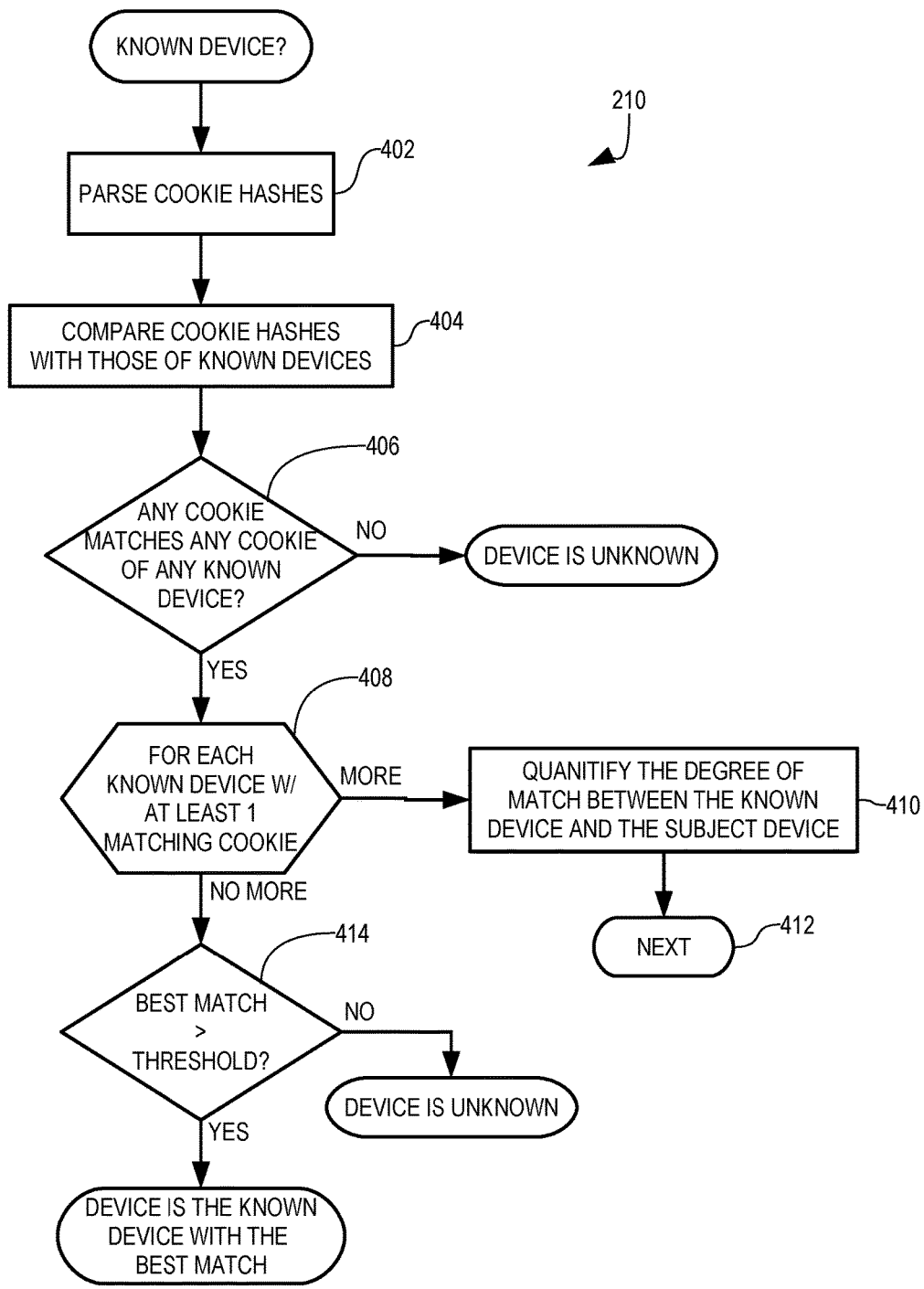
FIG. 4 is a logic flow diagram illustrating in greater detail the manner in which the server computer determines whether the device identifier represents a known device in a step of the transaction flow diagram of FIG. 2.

In step 210, server computer 106 determines whether the device identifier received in step 208 represents a client device that is previously known to server computer 106. Step 210 is described in greater detail below in conjunction with logic flow diagram 210 (FIG. 4).

If server computer 106 determines that the device identifier represents a known device, server computer 106 sends content that is customized for client device 102. In some embodiments, the content is customized to indicate a lack of access to services provided by server computer 106, particularly when server computer 106 determines that the device identifier represents a client device with a history of malicious acts.

As described above, client device 102 generates a device identifier for itself from browser cookies 730 (FIG. 7) in step 206 (FIG. 2) and step 206 is shown in greater detail as logic flow diagram 206 (FIG. 3). In this illustrative embodiment, step 206 is performed by web browser plug-in 722C (FIG. 7).

In step 302 (FIG. 3), web browser plug-in 722C collects all cookies 730 of all types. The various types of browser cookies are known and are not described herein, except that the basic data content of a cookie is described to facilitate appreciation and understanding of the present invention. Furthermore, while collection of all cookies of all types is described herein, it should be appreciated that effective device recognition can be accomplished using fewer than all cookies and using cookies of fewer than all types.

Loop step 304 (FIG. 3) and next step 312 define a loop in which web browser plug-in 722C processes each of cookies 730 in accordance with steps 306-310. During each iteration of the loop of steps 304-312, the particular one of cookies 730 processed by web browser plug-in 722C is sometimes referred to herein as "the subject cookie."

In step 306, web browser plug-in 722C forms an irreversible hash of each data element of the subject cookie. Typically, a cookie includes data elements representing a host to which the cookie belongs or from which the cookie originated, an expiration date, and one or more name/value pairs representing the substantive content of the cookie. It is generally preferred that the actual content of the subject cookie not be communicated to server computer 106. Forming an irreversible hash of each of the data elements individually allows server computer 106 to test for matches without having direct access to original data.

In step 308, web browser plug-in 722C packages all the irreversible hashes of data elements of the subject cookie into a single, reversible hash representing the subject cookie in its entirety. The hash is reversible such that server computer 106 can parse the individual irreversible hashes of cookie data elements for individual element comparison in the manner described below.

In step 310, web browser plug-in 722C adds the hash created in step 308 to an accumulation of single reversible cookie hashes.

Once all of cookies 730 (FIG. 7) have been processed by web browser plug-in 722C according to the loop of steps 304-312 (FIG. 3), processing according to logic flow diagram 206, and therefore step 206 (FIG. 2), completes. The output of step 206 is a device identifier 800 in the form of an accumulation of reversible hashes that represent data elements of multiple cookies of client device 102.

Device identifier 800 comprises computer-readable digitized data, such as a bit stream, a bit array, or a concatenation of data bytes, of any length or memory size suitable for the purpose of recording the information contained therein. In more elaborate embodiments of the invention, the device identifier 800 may undergo further data processing prior to completion or prior to transmission from client device 102. For example, the output of step 206 may be further processed using known techniques such as encoding, encryption, compression, hashing, obfuscation, or appending with a nonce value or a checksum value, or modified according to a combination of some or all of the foregoing techniques.

As described above, server computer 106 (FIG. 1) determines whether the device identifier received in step 208 (FIG. 2) represents a client device that is previously known to server computer 106 in step 210, which is shown in greater detail as logic flow diagram 210 (FIG. 4). The steps of logic flow diagram 210 are performed by device recognition logic 624 (FIG. 6) of server computer 106 with reference to device identifier data 630 and cookie information 632.

In step 402 (FIG. 4), device recognition logic 624 parses sets of individual reversible hashes, each set representing a whole, individual cookie from the device identifier and parses the irreversible hashes of individual data elements from each of the parsed reversible hashes.

In step 404, device recognition logic 624 compares the parsed hashes to stored hashes of cookies of client devices from which cookie-based device identifiers have been previously received. In the context of logic flow diagram 210, client devices from which cookie-based device identifiers have been previously received by server computer 106 are sometimes referred to as "known devices".

In test step 406, device recognition logic 624 determines whether at least one cookie of the device identifier of client device 102 matches at least one cookie of any known device. If not, device recognition logic 624 determines that client device 102 is not recognized by server computer 106 as one with which server computer 106 has previously interacted and processing according to logic flow diagram 210, and therefore step 210 (FIG. 2), completes. In an alternative embodiment, device recognition logic 624 also determines whether all cookies of the device identifier of client device 102 are matched by cookies of a known device. If so, device recognition logic 624 determines that client device 102 is recognized by server computer 106 and is therefore known to server computer 106 and processing according to logic flow diagram 210, and therefore step 210 (FIG. 2), completes.

If at least one cookie of the device identifier of client device 102 matches at least one cookie of any known device and no known device is a perfect match for the device identifier, processing by device recognition logic 624 transfers to loop step 408.

Loop step 408 and next step 412 define a loop in which device recognition logic 624 processes each known device for which at least one cookie matched the device identifier of client device 102. For each such known device, processing transfers from loop step 408 to step 410. The particular known device processed in a given iteration of the loop of steps 408-412 is sometimes referred to herein as the subject known device.

In step 410, device recognition logic 624 quantifies a degree of match between the subject known device and the device identifier of client device 102. Step 410 is shown in greater detail as logic flow diagram 410 (FIG. 5).

Figure 5:
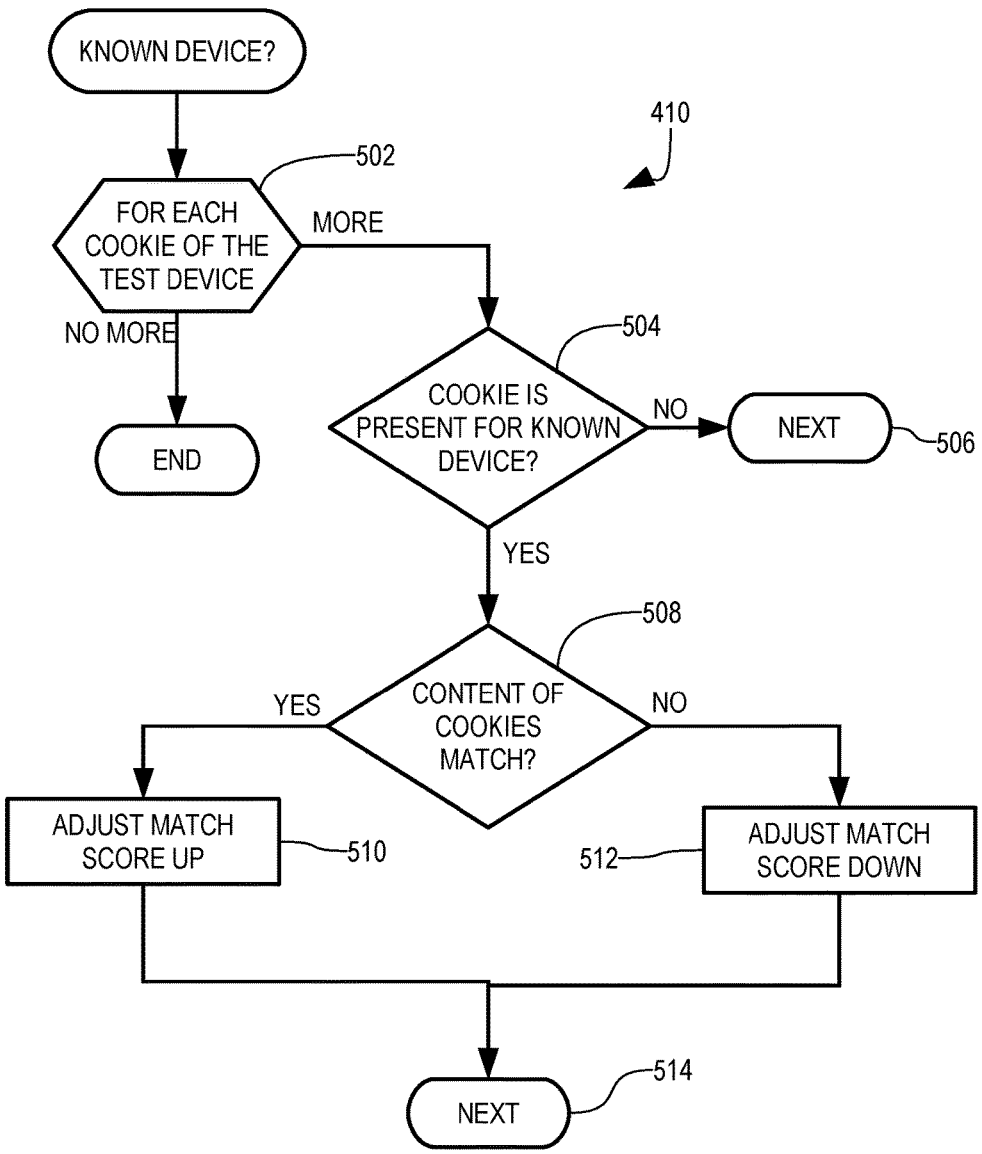
FIG. 5 is a logic flow diagram illustrating in greater detail a step of the logic flow diagram of FIG. 4.

With reference now to FIG. 5, loop step 502 defines a loop in which each iteration can be terminated by next step 506 or next step 514. In the loop of steps 502-514, device recognition logic 624 processes each cookie parsed from the device identifier of client device 102, and the particular cookie processed during a given iteration of the loop of steps 502-514 is sometimes referred to herein as the subject cookie. Device recognition logic 624 maintains a cumulative matching score for the subject known device and the matching score is initially set to a value that indicates a probability that the device identifier matches the subject known device. In different embodiments, the initial value may vary from zero to 100%. Generally, the probability changes with each iteration of the loop steps 502-514, and the probability value calculated or assigned after each iteration may be determined according to empirical data. The empirical data may be represented as a function or as a look-up table, or equivalent, and may be provided as part of device recognition logic 634, or made accessible thereto. In one preferred embodiment, the initial value is set to 50%, i.e. the probability of a match is as likely as not. The disclosure that follows provides an illustrative example of such an embodiment.

Figure 8:
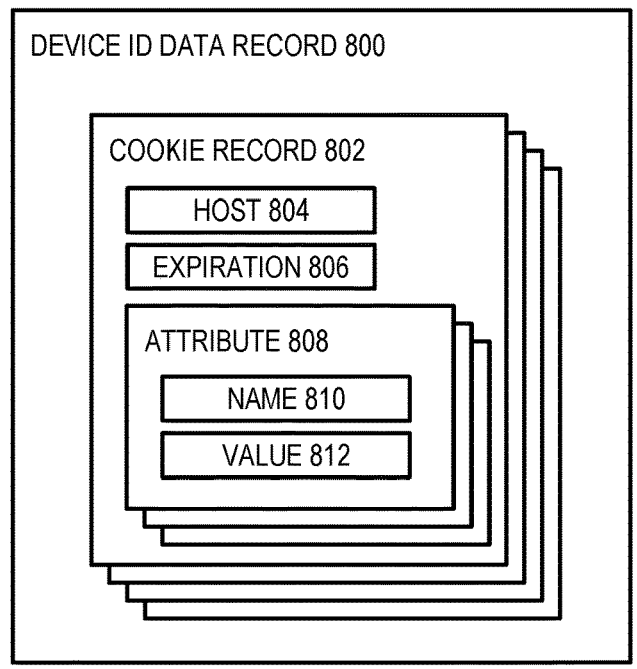
FIG. 8 is a block diagram of a device identifier data record used by the server computer to represent a known device, according to one embodiment of the invention.

In test step 504, device recognition logic 624 determines whether the subject cookie is present in the device identifier data record 800 (FIG. 8) for the subject known device. Each known device is represented in device identifier data 630 (FIG. 6) of server computer 106 by a device identifier data record such as device identifier data record 800.

Device identifier data record 800 is substantially analogous to the device identifier of client device 102 and includes one or more cookie records 802, each of which represents a cookie of the subject known device at the time the most recent device identifier was received from the subject known device.

Each of cookie records 802 includes a host hash 804, an expiration field 806, and one or more attributes 808. Host hash 804 is an irreversible hash of the host field of the original cookie of the subject known host. Accordingly, device recognition logic 624 cannot readily identify the host to which the original cookie belonged but can distinguish the original cookie from cookies of different hosts. Expiration field 806 represents the expiration of the original cookie and is decipherable by device recognition logic 624 such that device recognition logic 624 can determine whether the subject cookie has expired.

Each of attributes 808 represents a name/value pair of the original cookie of the subject known device. Name hash 810 and value hash 812 are irreversible hashes of the name and value, respectively, of a name/value pair of the original cookie of the subject known device. Since name hash 810 and value hash 812 are separate irreversible hashes, device recognition logic 624 can correlate attributes with matching names and compare the values thereof without having access to the original name and value data of the original cookie.

In one embodiment, device recognition logic 624 determines whether the subject cookie is present in device identifier data record 800 (FIG. 8) by determining whether host hash 804 for any of the cookie records 802 of device identifier data record 800 matches a host hash for the subject cookie. In an alternative embodiment, device recognition logic 624 determines whether the subject cookie is present in device identifier data record 800 by determining whether host hash 804 for any of the cookie records 802 of device identifier data record 800 matches a host hash for the subject cookie and at least one of attributes 808 has a name hash 810 that matches a name hash in an attribute of the subject cookie. Thus, a "cookie" can be all name/value pairs collectively for a given host as presented by cookie record 802 or can be a specific name/value pair for a given host as represented by attribute 808.

If the subject cookie is not present for the subject known device, processing by device recognition logic 624 transfers through next step 506 to loop step 502 and processes the next cookie of the device identifier of client device 102 according to steps 502-514. In transferring through next step 506, device recognition logic 624 does not adjust the matching score for the subject known device.

If the subject cookie is present for the subject known device, processing by device recognition logic 624 transfers to test step 508 in which device recognition logic 624 determines whether the content of the subject cookie matches the content of the corresponding cookie record 802 of the subject known device. If the content of the respective cookies match, processing transfers to step 510 in which device recognition logic 624 adjusts the matching score of the subject known device upward or in some manner to indicate that the subject known device is more likely the same device as client device 102. Conversely, if the content of the respective cookies do not match, processing transfers to step 512 in which device recognition logic 624 adjusts the matching score of the subject known device downward or in some manner to indicate that the subject known device is less likely the same device as client device 102.

Figure 6:
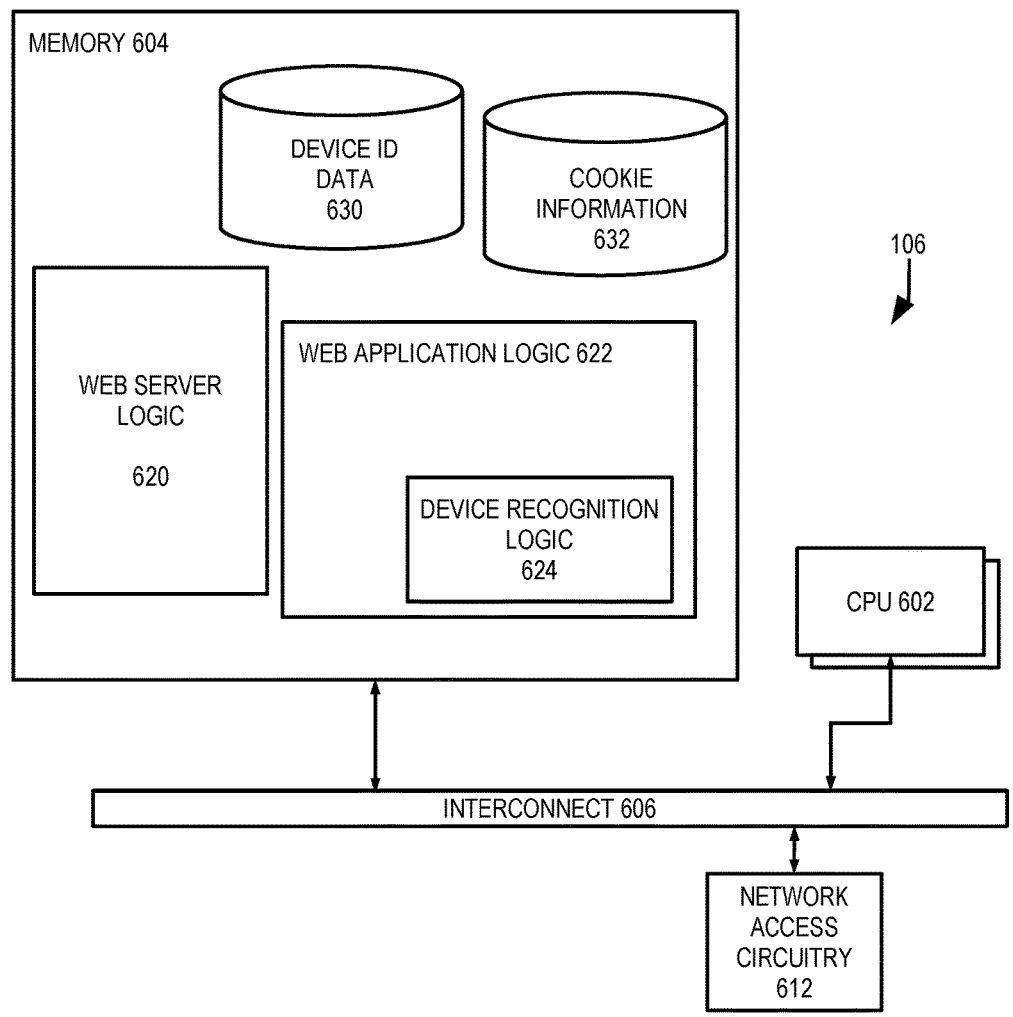
FIG. 6 is a block diagram showing the server computer of FIG. 1 in greater detail.
Figure 9:
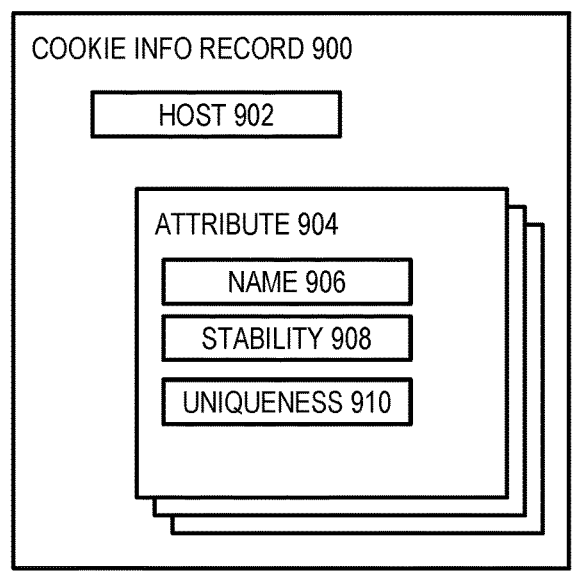
FIG. 9 is a block diagram of a cookie information record used by the server computer in one embodiment of the invention to determine whether a device identifier of the client device matches a device identifier data record of a known device.

The manner in which device recognition logic 624 determines whether the content of corresponding cookies match and adjusts the matching score of the subject known device varies from cookie to cookie. Each cookie that has been evaluated by device recognition logic 624 is represented by a cookie information record 900 (FIG. 9) stored in cookie information 623 (FIG. 6). In this description, cookie information record 900 represents the subject cookie.

Cookie information record 900 (FIG. 9) includes a host hash 902 to anonymously identify the host whose cookies are represented by cookie information record 900 and includes one or more attributes 904 corresponding to each of attributes 808 (FIG. 8) that device recognition logic 624 has processed for cookies associated with host hash 902.

For each of attributed 904, cookie information record 900 includes a name hash 906, a stability field 908, and a uniqueness field 910. Name hash 906 corresponds to name hash 810 (FIG. 8) and serves to anonymously identify the particular attribute of the subject cookie. Stability field 908 indicates a degree of stability of the subject cookie. Uniqueness field 910 indicates a degree of uniqueness of values of the subject cookie.

Some cookies are more stable than others. Some hosts set a cookie to a given value and the value remains unchanged for extended periods of time. Sometimes, the value is maintained even when an expired cookie is renewed. Other hosts use cookies for very brief transactions and reset the cookie to a new value each time a new transaction is initiated. Device recognition logic 624 observes cookies over time to assess the stability of a given attribute of a cookie from a specific host, though identified anonymously through an irreversible hash.

Similarly, some cookies are more unique than others. Some hosts reuse cookie values when the use of those values for another device has concluded. Device recognition logic 624 observes cookies over time and across devices to assess the uniqueness of a given attribute of a cookie from a specific host.

Cookies that are more stable and more unique are more indicative of a device's identity. Thus, device recognition logic 624 weighs more stable, unique attributes of cookies more heavily than less stable, less unique attributes in determining whether cookies match. For example, if cookies match in a highly stable, highly unique attribute but do not match in a relatively unstable and relatively non-unique attribute, device recognition logic 624 can determine that the cookies match despite a mis-matched attribute. In addition, the determination of a match despite the mismatched attribute is used by device recognition logic 624 to assess the stability of the attribute.

The stability and uniqueness of attributes of a cookie also influence the manner in which device recognition logic 624 adjusts the matching score of the subject known device in steps 510 and 512. Adjustments to the matching score are larger for attributes that are stable and unique and are smaller for attributes that are instable or not unique. The degree of adjustment may be quantified according to the empirical data accessible by the device recognition logic.

Once all cookies of the device identifier of client device 102 have been processed according to the loop of steps 502-514, processing by device recognition logic 624 according to logic flow diagram 410, and therefore step 410 (FIG. 4), completes.

In the loop of steps 408-412, device recognition logic 624 quantifies a degree of match between client device 102 and each known device for which at least one cookie matched the device identifier of client device 102. Once each such known device has been processed by device recognition server 624 in the loop of steps 408-412, processing transfers to test step 414.

In test step 414, device recognition logic 624 compares the best match, i.e., the quantified match that indicates the greatest likelihood of a match to client device 102, to a predetermined threshold. The threshold can be determined empirically to represent a desired likelihood of an accurate match, e.g., 95%.

If the best match is not at least the predetermined threshold, device recognition logic 624 determines that client device 102 is not a device with which server computer 106 has previously interacted. If the best match is at least the predetermined threshold, device recognition logic 624 determines that client device 102 is the known device associated with the best match. In either case, processing according to logic flow diagram 210, and therefore step 210 (FIG. 2), completes.

In this manner, server computer 106 can accurately recognize known devices and can interact with known devices in a manner influenced by previous interactions.

In addition, upon determining that client device 102 is the known device associated with the best match in test step 414 (FIG. 4), device recognition logic 624 updates device identification data record 800 of the known device to incorporate any changes in cookies of client device 102 represented in the device identifier. In addition, any such changes or absence of changes are used by device recognition logic 624 to assess the stability and uniqueness of cookie attributes. Device recognition logic 624 reflects any changes in stability or uniqueness in cookie information 632.

Server computer 106 is shown in greater detail in FIG. 6. Server computer 106 includes one or more microprocessors 602 (collectively referred to as CPU 602) that retrieve data and/or instructions from memory 604 and execute retrieved instructions in a conventional manner. Memory 604 can include generally any computer-readable medium including, for example, persistent memory such as magnetic and/or optical disks, ROM, and PROM and volatile memory such as RAM.

CPU 602 and memory 604 are connected to one another through a conventional interconnect 606, which is a bus in this illustrative embodiment and which connects CPU 602 and memory 604 to network access circuitry 612. Network access circuitry 612 sends and receives data through computer networks such as wide area network 104 (FIG. 1).

A number of components of server computer 106 are stored in memory 604. In particular, web server logic 620 and web application logic 622, including device recognition logic 624, are all or part of one or more computer processes executing within CPU 602 from memory 604 in this illustrative embodiment but can also be implemented using digital logic circuitry. Device identification data 630 and cookie information 632 are data stored persistently in memory 404. In this illustrative embodiment, device identification data 630 and cookie information 632 are each organized as all or part of one or more databases.

Web server logic 620 is a conventional web server. Web application logic 622 is content that defines one or more pages of a web site and is served by web server logic 620 to client devices such as client device 102. Device recognition logic 624 is a part of web application logic 622 that determines whether a given client device is recognized as a client device with which server computer 106 has previously interacted in the manner described above.

Client device 102 may be a personal computing device and is shown in greater detail in FIG. 7. Client device 102 includes one or more microprocessors 702 (collectively referred to as CPU 702) that retrieve data and/or instructions from memory 704 and execute retrieved instructions in a conventional manner. Memory 704 can include generally any computer-readable medium including, for example, persistent memory such as magnetic and/or optical disks, ROM, and PROM and volatile memory such as RAM.

CPU 702 and memory 704 are connected to one another through a conventional interconnect 706, which is a bus in this illustrative embodiment and which connects CPU 702 and memory 704 to one or more input devices 708, output devices 710, and network access circuitry 712. Input devices 708 can include, for example, a keyboard, a keypad, a touch-sensitive screen, a mouse, a microphone, and one or more cameras. Output devices 710 can include, for example, a display—such as a liquid crystal display (LCD)—and one or more loudspeakers. Network access circuitry 712 sends and receives data through computer networks such as wide area network 104 (FIG. 1).

A number of components of client device 102 are stored in memory 704. In particular, web browser 720 is all or part of one or more computer processes executing within CPU 702 from memory 704 in this illustrative embodiment but can also be implemented using digital logic circuitry. As used herein, "logic" refers to (i) logic implemented as computer instructions and/or data within one or more computer processes and/or (ii) logic implemented in electronic circuitry. Web browser plug-ins 722A-C are each all or part of one or more computer processes that cooperate with web browser 720 to augment the behavior of web browser 720. The manner in which behavior of a web browser is augmented by web browser plug-ins is conventional and known and is not described herein.

Cookies 730 are data stored persistently in memory 704 and are conventional and are used by web browser 720 in a conventional manner except as otherwise described herein.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

The reference to any prior art in this specification is not, and should not be taken as, an acknowledgement of any form of suggestion that such prior art forms part of the common general knowledge.

It will be understood that the term "comprise" and any of its derivatives (e.g. comprise, comprising) as used in this specification is to be taken to be inclusive of features to which it refers, and is not meant to exclude the presence of any additional features unless otherwise stated or implied.

What is claimed is:

1. A computer system comprising:
   at least one processor;
   a computer readable medium that is operatively coupled to the processor; and
   a first computing device recognition logic that (i) executes in the processor from the computer readable medium and (ii) when executed by the processor causes the computer system to recognize a given remotely-located device as either a known device or an unknown device by:
   receiving, from the given device, a device identifier generated by hashing multiple cookies supplied from at least two different hosts which cookies are stored on the given device;
   determining an amount of correlation between the device identifier of the given device and corresponding previously stored identifiers of each of one or more other devices; and determining that the given device is a known device upon a condition in which the amount of correlation is at least a predetermined threshold.

2. The system of claim 1 wherein the device identifier includes an irreversible hash of host data of each of the browser cookies.

3. The system of claim 1 wherein the device identifier includes an irreversible hash of attribute value data of each of the browser cookies.

4. The system of claim 1 wherein determining an amount of correlation between the device identifier of the given device and corresponding identifiers of each of one or more other devices comprises:

using a degree of stability of each of the identifiers.

5. The system of claim 1 wherein determining an amount of correlation between the device identifier of the given device and corresponding previously stored identifiers of each of one or more other devices comprises: using a degree of uniqueness of each of the device identifiers.

6. A non-transitory computer readable medium which includes one or more processors, and a memory, the computer readable medium including computer instructions which are configured to cause a server computer, by execution of the computer instructions in the one or more processors from the memory, to recognize a given remotely-located device as either a known device or an unknown device by:

receiving, from the given device, a device identifier generated by hashing multiple cookies supplied from at least two different hosts which cookies are stored on the given device;

determining an amount of correlation between the device identifier of the given device and corresponding previously stored identifiers of each of one or more other devices; and determining that the given device is a known device upon a condition in which the amount of correlation is at least a predetermined threshold.

7. The computer-readable medium of claim 6 wherein the device identifier includes an irreversible hash of host data of each of the browser cookies.

8. The computer-readable medium of claim 6 wherein the device identifier includes an irreversible hash of attribute value data of each of the browser cookies.

9. The computer-readable medium of claim 6 wherein determining an amount of correlation between the device identifier of the given device and corresponding identifiers of each of one or more other devices comprises:

using a degree of stability of each of the identifiers.

10. The computer-readable medium of claim 6 wherein determining an amount of correlation between the device identifier of the given device and corresponding previously stored identifiers of each of one or more other devices comprises: using a degree of uniqueness of each of the device identifiers.

* * * * *